Nov. 25, 1958  C. B. GREESON  2,861,817
HOSE HOLDER FOR SEPARABLE FLUID CONNECTION BETWEEN VEHICLES
Original Filed Sept. 29, 1949  2 Sheets-Sheet 1
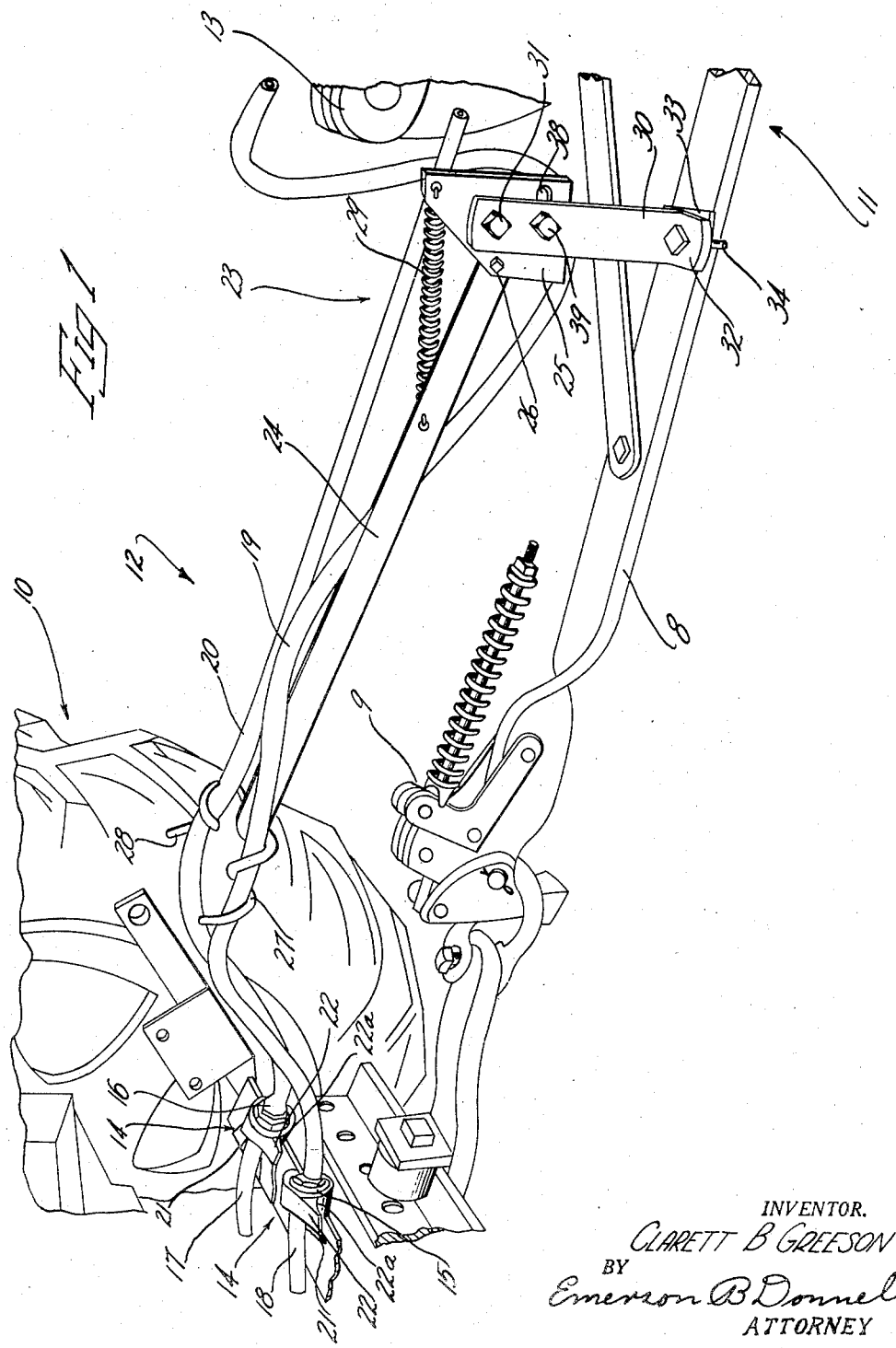
INVENTOR.
CLARETT B GREESON
BY
Emerson B Donnell
ATTORNEY Nov. 25, 1958    C. B. GREESON    2,861,817
HOSE HOLDER FOR SEPARABLE FLUID CONNECTION BETWEEN VEHICLES
Original Filed Sept. 29, 1949    2 Sheets-Sheet 2
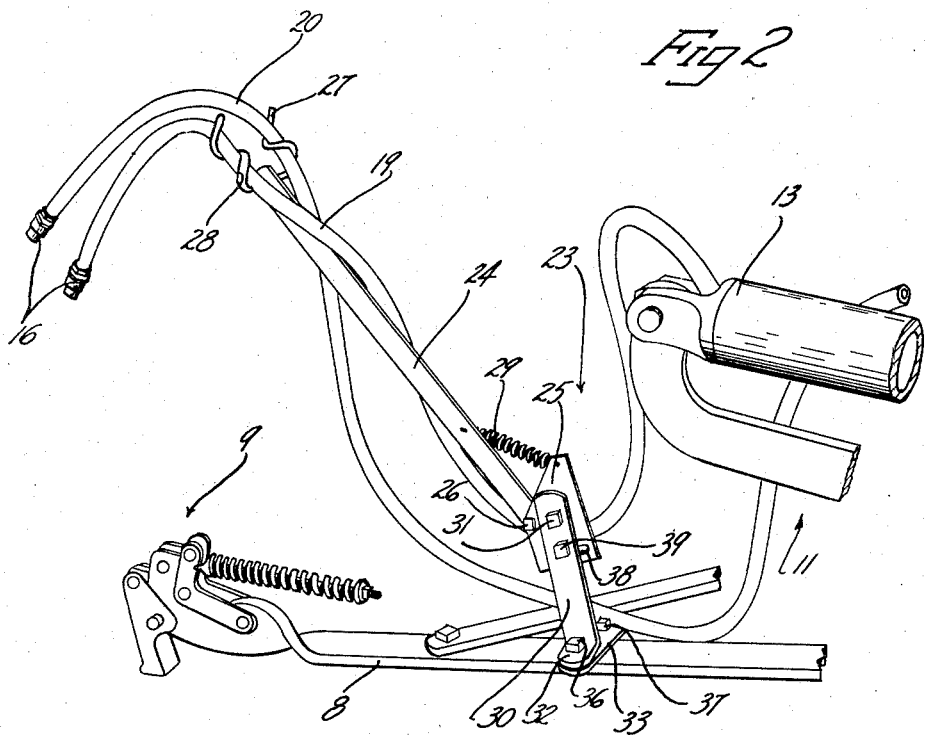
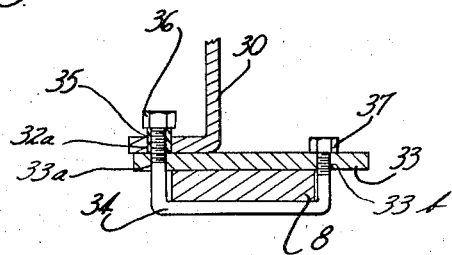
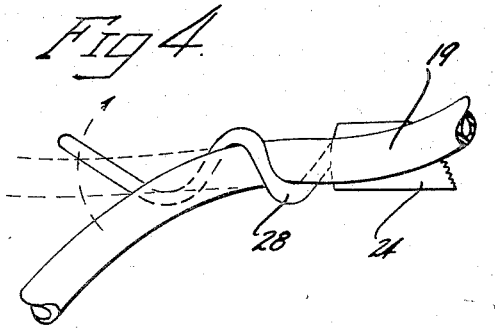
INVENTOR.
CLARETT B GREESON
BY
Emerson B Donnell
ATTORNEY

United States Patent Office 2,861,817
Patented Nov. 25, 1958

2,861,817

HOSE HOLDER FOR SEPARABLE FLUID CONNECTION BETWEEN VEHICLES

Clarett B. Greeson, Rockford, Ill., assignor to J. I. Case Company, Racine, Wis., a corporation of Wisconsin Original application September 29, 1949, Serial No. 118,644, now Patent No. 2,717,136, dated September 6, 1955. Divided and this application November 4, 1954, Serial No. 466,929

3 Claims. (Cl. 280—421)

My invention relates to a device for preventing the break-away couplings on hydraulically equipped vehicles from contacting the ground when the vehicles suddenly become separated. My invention further relates to a device wherein the slack of the hydraulic conduits or hoses of hydraulically equipped vehicles is taken up and damage resulting from dragging the conduits is substantially lessened.

This application is a division of my application Serial No. 118,644, filed September 29, 1949, issued as Patent No. 2,717,136 on September 6, 1955.

Valved break-away couplings of the type which commonly include a male connecting member and a female connecting member which are adapted to be releasably interengaged with one another, each of the members being adapted to be attached to a separate fluid conduit, are particularly useful in hydraulic systems in which the members frequently are connected and disconnected, as for example in the hydraulic systems which extend between coupled vehicles, wherein a hydraulic pressure unit in one vehicle is attached to operate on hydraulically actuated devices on other vehicles. If, due to striking an obstruction, or for any other reasons, the two vehicles suddenly become separated, one member of the break-away coupling is pulled away from the other member thereby stopping the flow of pressure between the two vehicles and, as in farm machines, allowing one of the coupling members to drop to the ground. Because of the nature of these break-away couplings, and the function which they perform, it is of vital importance for the effective operation of these hydraulic systems that dirt and similar substances do not enter into the couplings and thereby gain access to the hydraulic system.

It is therefore a primary object of my invention to provide a device which will prevent the coupling members from contacting the ground when the hydraulically connected vehicles suddenly become separated.

It is a further object of my invention to provide a hose support device of simple construction and operation and which exerts no undue force on the hose of the break-away couplings when the vehicles are in motion over rough terrain.

It is a still further object of my invention to provide a hose clamping means which while securely holding the hose as far as longitudinal movement is concerned, does not require any bolts, or other types of adjustments.

Yet another object of my invention is to provide a hose supporting device which is simply and economically manufactured, and which is durable and performs its functions in a highly efficient manner.

A hose supporting device embodying the preferred form of my invention is shown in the accompanying drawings wherein:

Fig. 1 is a right-side elevational view of my invention employed on an implement which is drawn by a tractor.

Fig. 2 is a right-side elevational view of my invention showing the position of my invention when the implement suddenly becomes separated from the tractor.

Fig. 3 is an enlarged view taken on the line 3—3 of Fig. 1 with parts removed.

Fig. 4 is an enlarged fragmentary view of the gripping means with the conduit partly held thereby.

As seen in Fig. 1 of the drawings, a tractor 10, only the rear portion of which is shown, is connected to a vehicle or implement 11, only the front portion of which is shown, by a spring break-away hitch 9, of well-known construction forming part of the forward extremity of the draw-bar 8 of the implement 11. A hydraulic system 12 extends between the tractor 10 and the implement 11, wherein a hydraulic pressure unit of the tractor 10, of well-known construction not shown in the drawings, is adapted to operate a hydraulic ram 13, on the implement 11, only partly shown on the drawings. Valved break-away couplings 14, of common and well-known type, comprising in the present instance female members 15 and male members 16, which members are releasably interengaged with one another, are attached to separate flexible conduits 17, 18, 19 and 20. It will be seen in Fig. 1 that the flexible conduits 17 and 18 connect in the present instance the hydraulic pressure unit of the tractor 10 to the female member 15 of the hydraulic couplings 14, which members are secured to the tractor 10 by means of bifurcated supporting brackets 21 and upper and lower clamp segments 22 and 22a. Flexible conduits 19 and 20 in the present instance connect the hydraulic ram 13 of the implement 11 to the male members 16 of the hydraulic couplings 14. It should be clear that when the coupling members 15 and 16 are interengageably connected, the pressure from the hydraulic pressure unit of the tractor 10 can flow through the continuous conduits 17 and 20 or the continuous conduits 18 and 19 to the hydraulic ram 13 of the implement 11.

A hose supporting device, generally designated 23, is swively secured in the present instance to the draw-bar 8 of the implement 11 and extends forwardly and upwardly. The hose supporting device 23 comprises a forwardly extending support arm 24, pivotally secured adjacent its rearward extremity to a plate 25 as by a bolt or any other suitable means 26.

Adjacent the forward extremity of the inclining arm 24 are secured a pair of helical coils or gripping means 27 and 28. The conduits 19 and 20 are frictionally held by the helical coils, as far as moving longitudinally through said coils is concerned, by making the inside diameter of the coils 27 and 28 of slightly smaller diameter than the outside diameter of the flexible conduits 19 and 20, while making the longitudinal spacing between the separate convolutions enough greater than the diameter of said flexible conduits so that the latter can be introduced into the clamps by a wrapping or winding operation as illustrated in Fig. 4. It should be appreciated that these coils 27 and 28 provide a very efficient and economical clamping means for the conduits 19 and 20 requiring no adjustment nuts or springs and allowing the operator to easily release the conduits from the coils by simply unwinding the conduits from the inside of the coils. Since the inside diameter of the coils 27 and 28 is slightly smaller than the outside diameter of the conduits 19 and 20, they press gently into the surfaces of the resilient material of the conduits, and longitudinal or sliding movement of the conduits through the spirals can be effected, if at all, only with great difficulty, while the wear which ordinarily results when flexible conduits are secured against moving longitudinally by means of bolts, springs, or other means, is virtually eliminated and the effective life of these conduits is greatly increased.

For lifting the conduits at such times as the vehicles become separated, a spring 29 is interposed between the plate 25 and the support arm 24 to pull upwardly so that the moment of the force exerted by the spring 29 about the pivot bolt 26 of the support arm 24 is virtually at any point in the arc of travel of the inclining arm about the bolt 26, only slightly greater than the moment of the force exerted by the combined weights of the inclined arm 24 and the flexible conduits 19 and 20 about the pivot bolt 26. This is accomplished as can be seen in Figs. 1 and 2 by positioning the spring 29 between the support arm 24 and the plate 25 so that the effective leverage of the spring 29 upon the pivot bolt 26 of the arm 24 increases as the force of the spring 29 decreases.

The plate 25 is secured to the upper extremity of a swivel bracket or standard 30 by means of a bolt or other suitable means 31. Swivel bracket 30 has a horizontally directed portion 32 which is provided with a hole 32a to accommodate a vertical pivot and holding assembly for bracket 30. The pivot and holding assembly comprises a holding bar 33 placed in the present instance upon the drawbar 8. A hook bolt 34 passes through holes 33a and 33b formed in the holding bar 33 and hole 32a of the bracket 30 to provide a clamp about the drawbar 8 of the implement. A spacer sleeve 35 is positioned between a nut 36 of the hook bolt 34 and the upper surface of the holding bar 33, and is slightly longer than the thickness of the horizontally directed portion 32 of the swivel bracket 30, thereby allowing the nut 36 and a nut 37 to be firmly tightened securing thereby the swivel bracket 30 and the holding bar 33 to the drawbar 8 but still allowing the swivel bracket 30 to turn freely in the horizontal plane upon the holding bar 33. Because of this freedom of movement in the horizontal plane as well as in the vertical plane, as has already been described, no undue forces are exerted on the conduits 19 and 20 or on the break-away couplings 14 as the implement 11 is drawn over irregular terrain by the tractor 10 or as the tractor 10 changes the direction of travel of the implement 11.

The moment of the force exerted by the spring 29 about the pivot bolt 26 of the support arm 24 can be increased or decreased by pivoting the plate 25 about the bolt 31 along the confines of a slot 38, rideable by a bolt 39 of the swivel bracket 30. It can be seen that by pivoting the plate in one direction, the spring 29 is lengthened whereas, by pivoting the plate in the other direction the spring is shortened. By lengthening the spring 29 the moment of force exerted by the spring 29 upon the arm is increased thereby tending to swing the arm 24 upwardly about the pivot bolt 26. When the correct spring length is found, the bolts 31 and 39 may be tightened thereby holding the plate 25 to the swivel bracket 30.

In the operation of this hose holding device the hoses 19 and 20 are securely held by the helical coils 27 and 28 of the support arm 24. The support arm, due to the greater moment of force as exerted by the spring 29 and as already fully explained, pivots the arm upwardly retained by the forward portion of the conduits 19 and 20 extending from the helical coil 27 and 28 to the couplings 14. The force exerted by the spring 29 upon the arm 24 is not sufficient to disengage the break-away couplings 14 when the members of the couplings are inter-engaged. When the spring break hitch 9 of the implement 11 releases the tractor 10, as for example when the implement strikes an obstruction, the conduits come under tension, and since the break-away couplings 14 require only a moderate force to become disengaged, the coupling members 16 are pulled out of the coupling members 15 interrupting the flow of fluid through the flexible conduits 17, 18, 19 and 20. When the coupling members 15 become disengaged from the coupling members 16, the support arm 24 is immediately swung upwardly about the pivot bolt 26 by the force of the spring 29. By adjusting the plate 25 along the slot 38, the upward swing of the arm 24 can be increased or decreased. Since the conduits 19 and 20 are prevented from moving longitudinally by the clamping means 27 and 28 as already described, the coupling members 16 are carried upwardly by the arm 24 thereby preventing the danger of dirt and similar material from adhering to the coupling members 16 and possibly entering the hydraulic system.

Various modifications and improvements within the spirit of my invention will doubtless occur to those skilled in the art from the disclosure herein given, and hence I do not wish to be limited to the particular construction shown or uses mentioned except to the extent that my invention is defined in the appended claims, which are to be interpreted as broadly as is consistent with the state of the art.

I claim:

1. For use with a propelling vehicle unit and a trailing unit interconnected for forward travel in unison by means including a separable hitch, wherein the propelling vehicle and the trailing unit respectively have fluid devices spaced apart longitudinally when the propelling vehicle and unit are normally hitched and wherein the fluid devices are interconnected by a flexible fluid transmitting conduit that is connected to the propelling vehicle fluid device by a coupling that is separable in response to the application of excessive forces thereto, as when the hitch separates and the propelling vehicle continues ahead without the trailing unit; the combination of said flexible fluid transmitting conduit, said conduit having a homogeneous resilient rubber-like outer wall, and a conduit carrier comprising an elongated member having at one end thereof means for supporting it to extend upwardly to a second end portion intermediate the fluid devices, and said elongated member having affixed thereto a substantially rigid helix, having an internal diameter slightly smaller than the external diameter of the hose so as to press gently into the external surface of said yieldable outer wall sufficiently to secure said hose against axial movement in said helix, whereby sufficient pull may be exerted on said hose by said helix to cause disconnection of said separable coupling.

2. A hose holder for use with a tractor implement combination of the type in which the implement may become detached from the tractor but in which it is necessary to provide a fluid pressure connection between the two, separable without damage by a substantial pull on the hose resulting from such disconnection; said holder comprising a plurality of substantially rigid helical axially aligned coils defining a cylinder, said coils being spaced axially to an extent sufficiently greater than the outside diameter of the hose that the latter may be introduced into said cylinder by a wrapping motion, and said cylinder having an internal diameter slightly less than the external diameter of a hose to be held in the holder so as to bite into the resilient surface of said hose whereby, by virtue of the resilient character of said surface, said helix will grip said hose with a large resistance to axial sliding thereof through said cylinder.

3. A hose holder for use with a tractor implement combination of the type in which the implement may become detached from the tractor but in which it is necessary to provide a fluid pressure connection between the two, separable without damage by a substantial pull resulting from such disconnection; the combination of a hose having a predetermined external diameter, a yieldable cylindrical outer wall of predetermined outer diameter, and capable of bending into a curve of predetermined sharpness a substantially rigid helix having an internal diameter slightly smaller than said predetermined external diameter so as to press gently into said yieldable outer wall substantially continuously along the length of said helix, for the purpose of preventing axial movement of said hose within said helix when said hose is straight within said helix, and the pitch of said helix being sufficiently long to provde a space between the convolutions thereof sufficient to admit said hose between any two successive convolutions of said helix when said hose is held within any remaining convolutions of said helix and bent into said curve of predetermined sharpness, whereby said hose may be introduced into said helix by a wrapping motion between the successive convolutions of said helix, the grip of said helix as a result of its gentle pressure on said yieldable outer wall effecting a large resistance against axial sliding of said hose through said helix, whereby sufficient pull may be exerted on said hose by said helix to cause disconnetcion of said fluid connection.

References Cited in the file of this patent

UNITED STATES PATENTS

| | | |
|---|---|---|
| 750,782 | Ramsey | June 26, 1904 |
| 1,644,661 | Aufenast | Oct. 11, 1927 |
| 2,171,761 | Paradise | Sept. 5, 1939 |
| 2,215,292 | Koscierzyna | Sept. 17, 1940 |
| 2,619,888 | Young | Dec. 2, 1952 |
| 2,673,093 | Silver | Mar. 23, 1954 |
| 2,717,136 | Greeson | Sept. 6, 1955 |

FOREIGN PATENTS

| | | |
|---|---|---|
| 106,092 | Australia | Dec. 22, 1938 |